Figure 1:
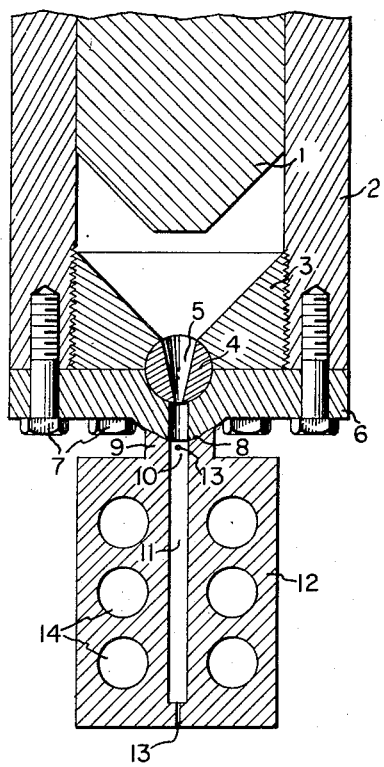

Nov. 20, 1956   O. M. HAHN ET AL   2,770,842
INJECTION MOLDING OF POLYTETRAFLUOROETHYLENE
Filed Jan. 22, 1954

INVENTORS
OLIVER M. HAHN
ROBERT S. MALLOUK

BY  Dennis L. Ryan, Jr.

AGENT

United States Patent Office 2,770,842
Patented Nov. 20, 1956

2,770,842

INJECTION MOLDING OF POLYTETRA-FLUOROETHYLENE

Oliver M. Hahn and Robert S. Mallouk, Wilmington, Del., assignors to E. I. du Pont de Nemours and Company, Wilmington, Del., a corporation of Delaware Application January 22, 1954, Serial No. 405,654

1 Claim. (Cl. 18—55)

This invention relates to a process for the injection molding of polytetrafluoroethylene.

The polymers with which the invention is concerned are of the general type disclosed in Plunkett U. S. Patent 2,230,654 and include the "granular" products obtained for example by the process of Brubaker U. S. Patent 2,393,967, hereinafter designated type I; the coagulated dispersion polymers such as those synthesized by the process of Berry U. S. Patent 2,559,752 and coagulated by the process of Lontz U. S. Patent 2,593,583, hereinafter termed type II, and the telomeric products obtained for example by including 0.075 part of methanol in batch D of Example VII of the aforesaid Berry patent, and coagulating the polymerized product by the process of the aforesaid Lontz patent, such material being hereinafter referred to as type III polymer.

It has heretofore been disclosed that polytetrafluoroethylene can be molded by cold pressing the finely-divided polymer to desired shape and thereafter fusing it either free as in Brubaker et al. U. S. Patent 2,400,099, or in a closed mold, as in Benning et al. U. S. Patent 2,400,094, at 327 to 550° C., so as to obtain an integrally-bonded shaped piece. It is also known to conform a hot fused article to precise dimensions by cooling it from fusion temperature to below 250° C. in a closed mold, as in Fields U. S. Patent 2,456,262. It is further known to extrude pre-baked powder through a die held above fusion temperatures so as to produce a continuous fused shaped article as in Cheney U. S. Patent 2,546,621. None of these procedures, however, has been successfully applied to the injection molding of polytetrafluoroethylene, inasmuch as the final products obtained were either imperfect, i. e. manifested voids, cracks or other faults, or required excessively long times in the fusion step of the cycle.

It is an object of the present invention to provide a process for injection molding polytetrafluoroethylene to sound flawless products. A further object is to provide such a process wherein the total time required for the injecting, fusing, cooling and ejecting steps is 10 minutes or less. Other objects will be apparent hereinafter.

According to the present invention these objects may be achieved by a procedure wherein a preliminarily granulated polymer is heated to a temperature in the range of 300 to 400° C. under a pressure sufficient to keep it from melting, injected into a mold, and melted substantially instantaneously thereafter.

Figure 3:
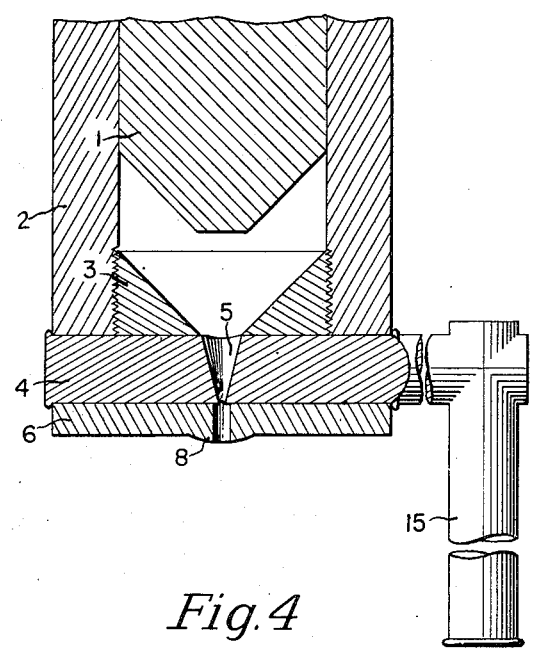
Figure 4:
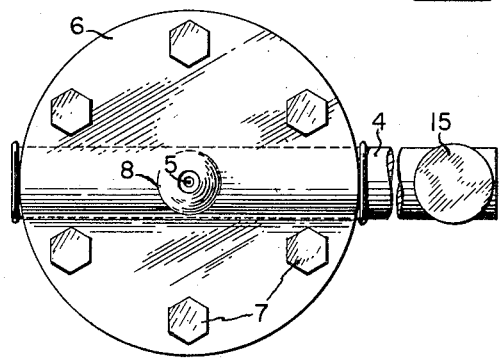
Figure 2:
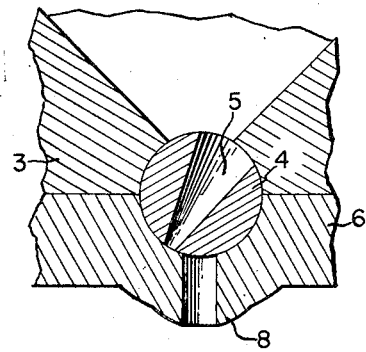

In the drawings Fig. 1 is a partial cross-section view of injection molding apparatus showing the cut-off valve in open position. Fig. 2 is a partial view from the same vantage point as Fig. 1, showing the cut-off valve in closed position. Fig. 3 is a partial cross-section view of the apparatus of Fig. 1 viewed from an angle 90° to the right of the view angle in Fig. 1. Fig. 4 is a bottom view of the apparatus of Fig. 1.

In the practice of the present invention, as more fully described hereinafter, referring now to Fig. 1, granulated polymer is compressed by the ram 1 into the barrel of cylinder 2 which is heated by any suitable heating means, not shown, and forced through the nozzle 3 and the cut-off valve 4 having an orifice 5, the cut-off valve 4 being held in place by an end-plate 6 secured with bolts 7 and having a sprue-seating boss 8, then thru the sprue 9 and gate 10 into the mold-cavity 11 of mold 12 which is provided with weep-holes 13 and cores for heating and cooling 14. After the polymer has filled the mold cavity 11, the cut-off valve 4 is turned as shown in Fig. 2 by means of the handle 15, shown in Figs. 3 and 4. It will be understood that the particular apparatus shown forms no part of the present invention and is included entirely for the purpose of schematic illustration.

In one preferred embodiment of the invention type I powdered polymer is granulated by heating to a temperature of 350° C. for about 10 minutes, thereafter cooled to ordinary temperatures, and micropulverized to obtain small relatively dense free flowing granules. These granules are charged to the barrel of a ram operated Watson-Stillman injection molding machine, the barrel being at the time at a temperature of about 300° C. The granules are compacted within the barrel under a pressure of 10,000 p. s. i. g. whereby the melting point of the polymer is raised above 400° C., and thereafter heated under such pressure to a uniform temperature of about 375° C. A portion of the compacted mass is then injected to a mold maintained at about 320° C., whereby the melting point of the portion injected is substantially instantaneously reduced and therefore the charged portion is transformed into the non-crystalline gel state. The charge is allowed to cool within the mold to below 327° C. during 2 to 8 minutes and thereafter ejected.

It is essential to the practice of the invention that the polymer be granulated prior to the time of being injected into the mold. Various procedures may be used to effect the granulation. In general the best method of effecting granulation will depend upon the type of polymer being used and the size and complexity of the article to be molded. The rate at which densification of the several types of polymer occurs at elevated temperatures ordinarily will vary markedly. For example, when pressed into chips and heated at 360° C., virgin polymer of type I will attain a density of about 2.16 in an hour, whereas type II may reach about 2.19 and type III polymer about 2.25 under the same conditions. Accordingly substantially shorter times will be required to effect adequate densification of the type II and III polymers.

Where the deformation of the compacted mass necessary to fill the mold is relatively small, the degree of densification necessary to afford ready slippage of the granules past each other during the injection is relatively low. If the granules are insufficiently densified, they will form individual oriented structures, on being deformed, which are difficult to fuse into sound integral objects. On the other hand, with relatively complex molds, a higher degree of densification is required to obtain ready slippage. Advantageously, however, the degree of densification effected will be no more than necessary, inasmuch as the time required to bring about fusion of the granules into an integral mass when they are raised above their melting point will increase with the increase in degree of densification preliminarily effected.

The densification phase of the granulating process may conveniently be carried out at temperatures in the range of 150 to 350° C., either by baking in powder form or as a preform of cold-pressed particles. Generally speaking, with virgin polymer, the baking will require not more than about 15 minutes at 350° C. and not less than about 30 minutes at 150° C. in order to obtain satisfactory free-flowing granules for the purposes of the invention.

Following the densification, desirably the products are comminuted to fine size, ordinarily less than about 0.1 mm. in order to complete the granulation. In general the finer the granules, the more readily the slippage between them without excessive shearing will be achieved. The comminution may be accomplished for example by micropulverizing them or by cutting the particles in water slurry.

In preheating the granulated products just prior to injecting them, it is essential to keep the polymer below its melting point. Once the granules are melted they form an extremely viscous gel which will readily fragment if greatly deformed, and leave cracks or flaws in the molded product which are difficult to heal. However, the melting point of the polymer increases approximately 9° C. for each 1000 p. s. i. g. increase in pressure, and accordingly by subjecting the granules to sufficient pressure before they are heated above 327° C., their normal melting point at atmospheric pressure, the compacted mass may safely be heated to temperatures well above 327° C. without melting. It will be understood however that polytetrafluoroethylene is not a sharp-melting product, and the term melting point as used herein refers to the temperature at which the X-ray patterns characteristic of crystalline materials disappear. At such temperatures the polymer changes its appearance to a translucent gel.

Preferably preheat temperatures of about 350 to 375° C. at pressures of about 10,000 p. s. i. g. will be used when working with the type I polymers. However the general range of about 300 to 400° C. and 2000 p. s. i. g. upwards may be employed to advantage, pending on the circumstances of the particular case.

It is further essential to the successful practice of the invention that the product after injection be substantially instantaneously melted, otherwise the unequal expansion of the melted and unmelted portions of the injected material will cause shear planes and flaws to develop which will markedly increase the difficulty of obtaining a sound molding. When the material injected is at relatively low temperatures, e. g., 300 to 325° C., substantially instantaneous melting may be achieved by heating the mold into which the injection is made to temperature on the order of 380° C., provided a relatively thin article, e. g., 1/8 inch or less thick is being molded. However, this procedure is subject to the disadvantage that the molding must be cooled to below 327° C. in order to readily eject the molded article without damage to it. Accordingly it is preferred to work at elevated temperatures such that on injection the pressure on the material after entering the mold will be sharply reduced, in consequence whereof it is rapidly transformed to the molten state. When working at such temperatures, it becomes possible to use a die which is maintained below 327° C., so that the time required to cool the molten polymer below its melting point is reduced, and undue heating and cooling of the mold is avoided. It will be understood that when injecting into a mold maintained at less than 327° C., the transition to and from its gel state is assisted by the reduction in pressure resulting from the contraction of the molded charge as it cools. Preferably the temperature of the mold under such circumstances will be held in the range of 280–320° C., depending again on the type of polymer being used, and the size and complexity of the mold. Too rapid cooling of large moldings may cause cracking due to unequal stresses developing within the mass on cooling.

The invention is more specifically illustrated by means of the following examples, which however are not intended to limit its scope.

*Example I.*—Finely divided type I polymer was heated in an air oven to a temperature of 350° C. for 15 minutes, cooled in air, and micropulverized to fine particles having an average dimension of less than about 0.1 millimeter. The granulated product so obtained was charged to 1⅛" diameter injection cylinder on a one-ounce Watson-Stillman injection molding machine, said cylinder being maintained at a temperature of 300° C. and forced at a pressure of 10,000 lbs. (after being heated to about 300° C.) through a ⅛" diameter gate and sprue (¾" long) into an end-fed ASTM D–638 standard tensile mold maintained at 380° C. The mold was cooled in air during about 8 minutes to about 320° C. and the article was ejected. The product was a sound, flawless specimen, similar in all respects to a product obtained by conventional compression molding techniques.

*Example II.*—A type II polymer was granulated by compacting at 3000 p. s. i. g., heating at 150° C. for 1 hour, and micropulverizing to pass an 0.027 inch screen. The polymer was charged to a vertical injection molding apparatus having a ⅞" diameter barrel and a ⅛" diameter gate and sprue ¾" long and heated under a pressure of 10,000 p. s. i. g. to a temperature of 355° C. at the top of the barrel and about 382° C. at the discharge end. The polymer was injected to a cavity defining a 2" x 3" rectangular ⅛" thick; the mold being held at a temperature of 304° C. After injection the product was retained within the mold for 2 minutes during cooling and then ejected. An excellent piece, similar in all respect to compression molded specimens, was obtained.

We claim:

A process for injection molding polytetrafluoroethylene which comprises the steps of heating granulated polymer to a preliminary temperature in the range of 327 to 400° C. under a pressure effective to prevent melting thereof, injecting the heated polymer into a closed mold maintained at a temperature below 327° C., and melting the injected polymer substantially instantaneously thereafter.

References Cited in the file of this patent

UNITED STATES PATENTS

| | | |
|---|---|---|
| Re. 22,899 | Tucker | July 15, 1947 |
| 2,359,013 | Tucker | Sept. 26, 1944 |
| 2,456,262 | Fields | Dec. 14, 1948 |
| 2,456,621 | Cheney | Dec. 21, 1948 |
| 2,559,750 | Berry | July 10, 1951 |